3,340,301
BIS-(PARA-TERTIARY AMINOALKOXY-HALO-
GENOPHENYL)-CYCLOALKANES
Adrian Marxer, Muttenz, Alan Francis Thomas, Vernier-Geneva, and Atso Ilvespaa, Neuallschwil, Switzerland, assignors to Ciba Corporation, New York, N.Y., a corporation of Delaware
No Drawing. Filed Sept. 29, 1965, Ser. No. 491,442
Claims priority, application Switzerland, Jan. 27, 1961, 995/61; Dec. 6, 1961, 14,150/61
5 Claims. (Cl. 260—570)

This is a continuation-in-part of our copending application, Ser. No. 168,542, filed Jan. 24, 1962, now U.S. Patent No. 3,247,199.

The present invention provides dialkyl-bis-(para-tertiary aminoalkoxy-halogenophenyl)-methanes in which the alkyl groups at the methylene group may be linked together, and their salts, and a process for preparing same.

In the new compounds the alkyl radicals attached to the methylene group may be identical or different from one another and represent preferably lower alkyl groups with 1 to 5 carbon atoms, such as methyl, ethyl, propyl, isopropyl, or straight or branched butyl or pentyl groups which may be bound in any desired position.

When the alkyl radicals are linked, they together form an alkylene radical, for example a lower alkylene radical, such as a tetramethylene or pentamethylene radical.

The alkylene radicals, which in the tertiary aminoalkoxy-halogenophenyl groupings link the tertiary amino groups to the oxygen atoms, are preferably unbranched or branched lower alkylene groups with 2 to 5 carbon atoms, which separate the tertiary amino group from the oxygen atom by at least 2 carbon atoms, such as ethylene groups, or unbranched or branched propylene, butylene or pentylene groups.

The phenylene radicals contain especially 1 to 2 halogen atoms each. The halogen atoms are preferably chlorine or bromine atoms and are advantageously in ortho-position to the tertiary aminoalkoxy group.

As substituents of the tertiary amino group there are particularly suitable lower hydrocarbon radicals which may be interrupted by hetero atoms, such as oxygen, sulfur or nitrogen, and may be bound to the alkylene radical, and/or they may be substituted by free hydroxyl, amino or mercapto groups or by halogen atoms, such as fluorine, chlorine or bromine. Particularly suitable lower hydrocarbon radicals are: lower alkyl or alkenyl radicals, such as methyl, ethyl, propyl, isopropyl, or unbranched or branched groups, linked in any desired position, including butyl, pentyl, hexyl or heptyl radicals, allyl or methallyl radicals, unsubstituted or alkylated cycloalkyl or cycloalkenyl groups such as cyclopentyl, cyclohexyl, cycloheptyl, cyclopentenyl or cyclohexenyl radicals; unsubstituted or alkylated cycloalkyl- or cycloalkenyl-alkyl groups such as cyclopentyl- or cyclohexenyl-methyl, -ethyl or -propyl radicals; aralkyl or aralkenyl such as phenylmethyl-, -ethyl, -vinyl or propyl groups, or alkylene or alkenylene radicals such as for example as 1:4-butylene, 1:5-pentylene, 1:5-dimethylpentylene-(1:5), 1:6-hexylene or 1:5-hexylene. Radicals of this type that are interrupted by heteroatoms are, for example, alkoxyalkyl or oxa-cycloalkyl-alkyl radicals, such as methoxyethyl, ethoxyethyl, propoxyethyl, butoxyethyl, methoxypropyl, methoxyethoxyethyl, tetrahydrofurylmethyl, methylmercaptoethyl, oxa-, aza- or thia-alkylene- or -alkenylene radicals such as 2-azabutene-(1:2)-ylene-(1:4), 2-aza, oxa, or thia-butylene-(1:4) groups, 2-aza-pentene-(1:2)-ylene-(1:5), 3-aza-, oxa- or thia-pentylene-(1:5), 3-azahexylene(1:6), 1:5 - dimethyl-3-azapentylene-(1:5), 3-methyl-3-aza-pentylene-(1:5) or 3-hydroxyethyl-3-azapentylene-(1:5). Tertiary aminoalkoxy radicals, in which a substituent of the tertiary amino group is linked with the alkylene radical, or for example N-alkyl-pyrrolidinyl-2- or -3-alkoxy radicals or N-alkyl-piperidyl-2-or -3-alkoxy radicals.

The amine group is primarily a di-lower alkylamino group such as the dimethylamino, diethylamino, dipropylamino, N-methyl-N-ethylamino group, an N-lower alkyl-N-cycloalkylamino group such as the N-methyl-N-cyclopentyl or -cyclohexyl group, or a pyrrolidino, piperidino, morpholino or thia-morpholino group such as the pyrrolidino, piperidino, morpholino, piperazino or N-methylpiperazino group.

The new compounds possess valuable pharmacological properties. Inter alia, they display an antipyretic, analgesic and anti-inflammatory action. More especially they have an antiparasitic, such as an amoebicidal and trypanocidal action, which enables them to be used pharmacologically or as medicaments. They are also useful as intermediate products for the preparation of medicaments.

Of special value are the compounds of the formula

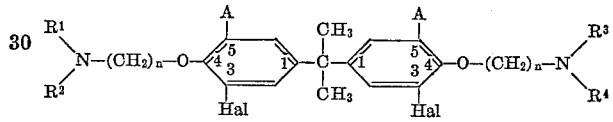

where $n=2$ or 3; "Hal" stands for chlorine or bromine and A for chlorine, bromine or hydrogen, and $R^1$ to $R^4$ represent lower alkyl radicals, or $R^1$ and $R^2$ together with the nitrogen atom and/or $R^3$ and $R^4$ together with the nitrogen atom, may also represent an alkyleneimino ring which may be interrupted by hetero atoms as specified above—and their salts, and the compounds of the formula

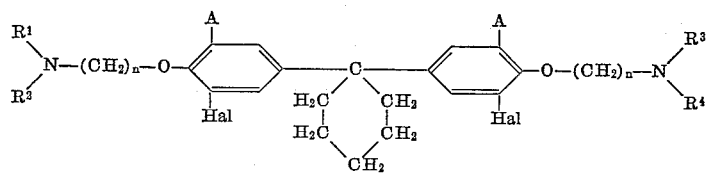

in which Hal, A, $n$ $R^1$ to $R^4$ have the meaning given above, and salts of these compounds.

The new compounds are obtained in known manner; preferably, a reactive ester of a tertiary aminoalkanol is reacted upon a compound of the formula

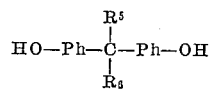

wherein $R^5$ and $R^6$ represent alkyl groups which may be linked together and the symbols Ph represent halogenated para-phenylene radicals—preferably in the form of a metal salt thereof such, for example, as an alkali metal salt, or in the presence of a condensing agent forming such a salt. Reactive esters are, for example, those with strong inorganic or organic acids, preferably those of hydrohalic acids such as hydrochloric, hydrobromic or hydriodic acid, or of arylsulfonic acids, such as benzenesulfonic or toluenesulfonic acid.

The afore-mentioned reaction is performed in a manner known per se, in the presence or absence of a diluent, at room temperature or a lower or higher temperature, under atmospheric or superatmospheric pressure.

Depending on the reaction conditions used, the new compounds are obtained in the form of the free bases or of their salts. From the salts the free amine bases can be prepared in the known manner. From the amine bases, on the other hand, salts can be prepared by treatment with acids that yield therapeutically useful salts, such, for example, as a hydrohalic acid, sulfuric, nitric, phosphoric, thiocyanic, acetic, propionic, oxalic, malonic, tartaric, succinic, malic, methanesulfonic, ethanesulfonic, hydroxyethanesulfonic, benzenesulfonic or toluenesulfonic acid, or other therapeutically acceptable acids.

The salts of the new compounds may also be used for purifying the bases obtained, for example, by converting a base into a salt thereof, separating the latter and reconverting it into the base.

The starting materials are known or can be made by known methods.

The invention includes also any variant of the present process in which an intermediate obtained at any stage thereof is used as starting material and the remaining step or steps is/are carried out, or the process is discontinued at any stage thereof, or the starting materials are formed under the reaction conditions. For example, a corresponding dialkyl-(para-tertiary-aminoalkoxy - halogenphenyl)-(para-hydroxy-halogenphenyl)-methane, may be reacted with a reactive ester of a tertiary aminoalkanol.

In this way, for example, compounds may be obtained in which the two tertiary amino groups are not identical.

The new compounds can be used as medicaments, for example in the form of pharmaceutical preparations containing them or their salts in admixture with an organic or inorganic, solid or liquid pharmaceutical excipient suitable for enteral, local or parenteral administration. Suitable excipients are substances that do not react with the new compounds such, for example, as water, gelatine, lactose, starches, magnesium stearate, talc, vegetable oils, benzyl alcohols, gums, polyalkylene glycols, white petroleum jelly, cholesterol or other known medicinal excipients. The pharmaceutical preparations may be, for example, tablets, dragées, ointments or creams, or in liquid forms solutions, suspensions or emulsions. They may be sterilized and/or may contain assistants such as preserving, stabilizing, wetting or emulsifying agents, salts for regulating the osmotic pressure, buffers and/or solution promoters. They may also contain further therapeutically valuable substances. The preparations are formulated by conventional methods.

The following examples illustrate the invention:

*Example 1*

A solution of 2.3 grams of sodium in 100 cc. of ethanol is treated with 19 grams of dimethyl-bis-[3-bromo-4-hydroxyphenyl]-methane in 200 cc. of ethanol. A solution of 15 grams of β-diethylamino-ethylchloride in 70 cc. of benzene is then added dropwise, and the whole is refluxed for 2 hours, cooled, filtered and evaporated to dryness in vacuo. The residue is dissolved in a mixture of 300 cc. of ether and 100 cc. of ethyl acetate, and the resulting dimethyl - bis-[3-bromo-4-(β-diethylamino-ethoxy)-phenyl]-methane of the formula

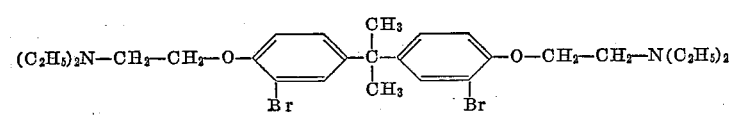

is extracted with 2 N-hydrochloric acid. The hydrochloric acid extract is alkalinized with 10 N-sodium hydroxide solution, the precipitated base is again taken up in ether+ethyl acetate, dried with sodium sulfate, and the solvents are evaporated. The residue is dissolved in 50 cc. of alcohol and treated with a concentrated solution of 19 grams of citric acid in ethanol. The resulting crystalline dicitrate is filtered off and recrystallized from alcohol. It melts at 129–131° C.

*Example 2*

A solution of 2.3 grams of sodium in 200 cc. of ethanol is treated with 38.6 grams of dimethyl-bis-[3-bromo-4-hydroxyphenyl]-methane in 200 cc. of ethanol. A solution of 15 grams of β-diethylamino-ethylchloride in 70 cc. of benzene is slowly added dropwise, and the whole is refluxed for 2 hours, then cooled, filtered, and evaporated to dryness in vacuo. The residue is dissolved in a mixture of 300 cc. of ether and 100 cc. of ethyl acetate and the resulting dimethyl-[3-bromo-4-(β-diethylamino-ethoxy)-phenyl]-[3'-bromo-4'-hydroxyphenyl] - methane of the formula

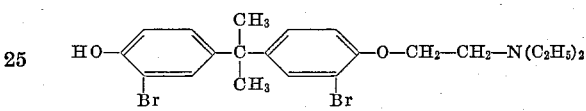

is extracted with 200 cc. of 2 N-hydrochloric acid. The hydrochloric acid extract is neutralized with 200 cc. of 2 N-sodium hydroxide solution, the precipitated base is once more taken up in ether+ethyl acetate, then dried with sodium sulfate, and the solvents are evaporated. The monocitrate melts at 125–127° C. (from alcohol).

The resulting dimethyl-[3-bromo-4-(β-diethylamino-ethoxy)-phenyl]-3'-bromo-4'-hydroxy-phenyl]-methane is reacted in a manner analogous to that described above with 15 grams of β-diethylaminoethyl chloride dissolved in 70 cc. of benzene and worked up as described in Example 1, to yield dimethyl-bis-[3-bromo-4-(β-diethyl-amino-ethoxy)-phenyl]-methane-dicitrate which is identical with the dicitrate described in Example 1.

*Example 3*

19.2 grams of solid dimethyl-bis-[3-bromo-4-hydroxyphenyl]-methane are stirred into a solution of 2.3 grams of sodium in 200 cc. of ethanol.

A solution of 18.5 grams of β-dimethylamino-ethylchloride hydrochloride in 25 cc. of water is mixed with 35 cc. of a concentrated solution of potassium carbonate. The precipitated chlorine base is taken up in 100 cc. of benzene, the benzene solution is dried and added dropwise to the solution of the diphenylmethane derivative. The mixture is refluxed for 3 hours, then filtered, concentrated to about one third of its volume, and the concentrate is treated with 50 cc. of 2 N-alcoholic hydrochloric acid, to yield the dihydrochloride of dimethyl-bis-[3-bromo-4-(β-dimethylamino-ethoxy)-phenyl]-methane of the formula

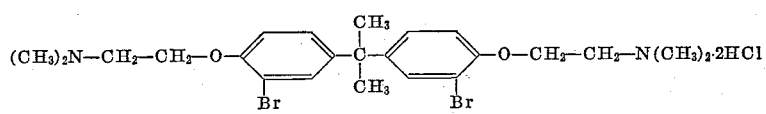

which melts at 201° C. after recrystallization from isopropanol.

Example 4

A solution of 2.3 grams of sodium in 200 cc. of ethanol is treated with 19.2 grams of dimethyl-bis-[3-bromo-4-hydroxyphenyl]-methane. From 21 grams of γ-dimethylaminopropylchloride hydrochloride the base is liberated as described in Example 3, taken up in benzene and added dropwise at room temperature to the solution of diphenylmethane; the mixture is boiled for 3 hours, then filtered and evaporated. The residue is dissolved in 100 cc. of a 1:1-mixture of alcohol and ether and treated with 50 cc. of 2 N-alcoholic hydrochloric acid. The dihydrochloride of dimethyl-bis-[3-bromo-4-(γ-dimethylaminopropoxy)-phenyl]-methane of the formula

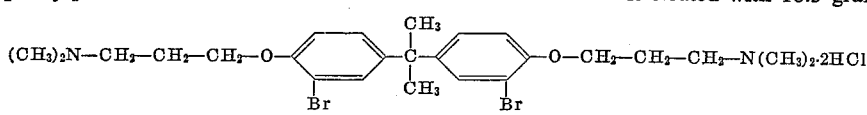

is precipitated with ether and recrystallized from isopropanol. It melts at 206° C.

Example 5

A solution of 2.3 grams of sodium in 200 cc. of alcohol is reacted with 15 grams of dimethyl-bis-[3-chloro-4-hydroxyphenyl]-methane as described in Example 4, and the resulting di-sodium salt is treated dropwise with 15 grams of β-diethylamino-ethylchloride in 70 cc. of benzene. The mixture is refluxed for 3 hours, then filtered and evaporated in vacuo. The residue is dissolved in 50 cc. of alcohol, treated with 19 grams of citric acid, and the dicitrate of dimethyl-bis-[3-chloro-4-(β-diethylamino-ethoxy)-phenyl]-methane of the formula

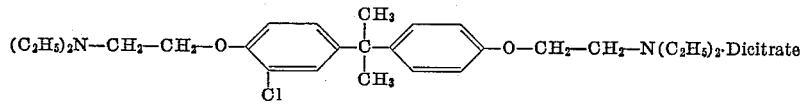

is caused to crystallize out by the addition of ether. After recrystallization from ethanol of 90% strength it melts at 149–150° C.

Example 6

A solution of 2.3 grams of sodium in 100 cc. of ethanol is treated with 15 grams of dimethyl-bis-[3-chloro-4-hydroxyphenyl]-methane. A benzolic dimethylamino-propylchloride solution is prepared by reacting a solution of 21 grams of γ-dimethylamino-propylchloride hydrochloride in 25 cc. of water with 50 cc. of concentrated potassium carbonate solution and taking up the reaction product in 150 cc. of benzene, and then stirred dropwise at room temperature into the above-described solution of the di-sodium salt. The whole is refluxed for 3 hours, filtered and treated with 50 cc. of 2 N-alcoholic hydrochloric acid. By adding ether the dihydrochloride of dimethyl-bis-[3-chloro - 4 - (γ - dimethylamino-propoxy)-phenyl]-methane of the formula

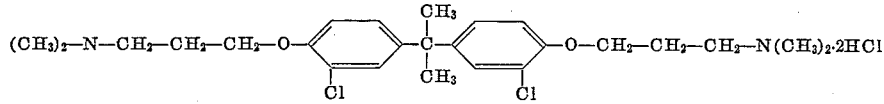

is caused to precipitate; after recrystallization from isopropanol it melts at 197–198° C.

Example 7

By the method described in Example 6 the base is liberated from 18.5 grams of β-dimethylamino-ehtylchloride hydrochloride, then dissolved in benzene and added dropwise to a solution prepared in the following manner: A solution of 2.3 grams of sodium in 100 cc. of ethanol is treated with 18.3 grams of dimethyl-bis-[3:5-dichloro-4-hydroxyphenyl]-methane. The mixture is refluxed for 3 hours, then filtered and evaporated to dryness in vacuo. The crystalline base is dissolved in alcohol and converted with 50 cc. of 2 N-alcoholic hydrochloride into the dihydrochloride of dimethyl - bis - [3:5-dichloro-4-(β-dimethylamino-ethoxy)-phenyl]-methane of the formula

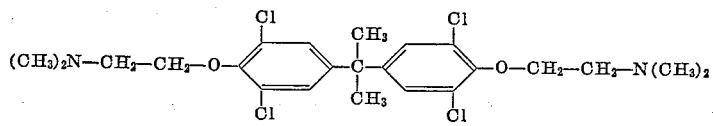

which, on addition of ether crystallizes, and after recrystallization from a mixture of isopropanol and ethyl acetate melts at 220° C.

Example 8

2.3 grams of sodium in 100 cc. of ethanol, 10.3 grams of dimethyl-bis[3:5-dichloro-4-hydroxyphenyl]-methane and 15 grams of β-diethylamino-ethylchloride in 70 cc. of benzene are reacted as described in Example 1, and the resulting dimethyl - bis - [3:5-dichloro-4-(β-diethyl-amino-ethoxy)-phenyl]-methane of the formula

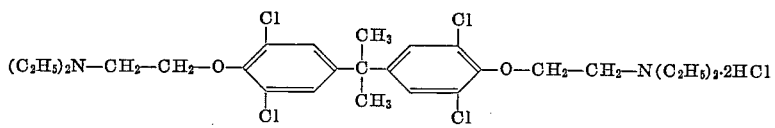

is converted into the dihydrochloride which, after recrystalization form isopropanol+ether, melts at 207–208° C.

Example 9

2.3 grams of sodium, 100 cc. of ethanol, 18.3 grams of dimethyl-bis-[3:5-dichloro-4-hydroxyphenyl]-methane and 21 grams of γ-dimethylamino-propylchloride hydrochloride are reacted and worked up by the method described in Examples 6 and 7, and the resulting dimethyl-bis - [3:5-dichloro-4-(γ-dimethylamino-propoxy)-phenyl]-methane of the formula

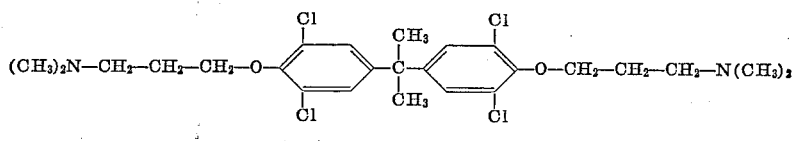

is converted into the dihydrochloride which, on recrystallization from a mixture of isopropanol and ethyl acetate, melts at 232° C.

Example 10

A solution of 2.3 grams of sodium in 100 cc. of absolute alcohol is mixed with a solution of 27.2 grams of dimethyl - bis-[3:5-dibromo-4-hydroxyphenyl]-methane in 200 cc. of absolute alcohol. In the course of 5 minutes 14.9 grams of β-diethylamino-ethylchloride in 50 cc. of absolute benzene are then added dropwise and the reaction mixture is stirred and refluxed for 6 hours and then allowed to cool. The precipitated sodium chloride is filtered off, and the mother liquor is evaporated to dryness. The oily residue is taken up in ether, extracted by being shaken twice with 2 N-sodium hydroxide solution, dried with sodium sulfate and converted with alcoholic hydrochloric acid into the dihydrochloride of dimethyl-bis-[3:5 - dibromo-4-(β-diethyl-amino-ethoxy)-phenyl]-methane of the formula

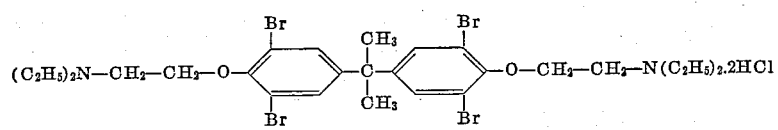

which settles out and, after recrystallization from isopropanol+ethyl acetate, melts at 208–209° C. with decomposition.

Example 11

A solution of 4.8 grams of sodium in 200 cc. of absolute alcohol is mixed with a solution of 27.2 grams of dimethyl - bis-[3:5-dibromo-4-hydroxyphenyl]-methane in 200 cc. of absolute alcohol. 20.47 grams of γ-diethylamino-propylchloride hydrochloride are then added and the reaction mixture is refluxed and stirred for 6 hours, and then allowed to cool. The precipitated sodium chloride is filtered off, and the mother liquor is evaporated to dryness. The residue is boiled for a short time with 100 cc. of ethyl acetate, filtered, treated with 50 cc. of 2.45 N-alcoholic hydrochloric acid and evaporated to dryness. The oily residue is dissolved in a small amount of isopropanol and ethyl acetate is added until crystallization sets in. After one hour the precipitated dimethyl-bis-[3:5-dibromo - 4 - (γ-diethylamino-propoxy)-phenyl]-methane dihydrochloride of the formula

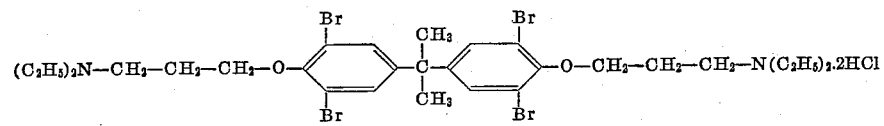

is suctioned off, washed with ethyl acetate and dried. It melts at 205–206° C.

Example 12

A solution of 27.2 grams of β:β-bis-(3:5-dibromo-4-hydroxy-phenyl)-propane in 200 cc. of absolute alcohol is added in one portion to a solution of 4.6 grams of sodium in 200 cc. of absolute alcohol. 18.6 grams of morpholinoethyl chloride hydrochloride are then added, the reaction mixture stirred under reflux for 6 hours and left to stand at room temperature overnight. The crystalline precipitate is suction-filtered, washed first with alcohol, then with water and dried to yield dimethyl-bis-[3:5-dibromo-4-(morpholino-ethoxy)-phenyl]-methane of the formula

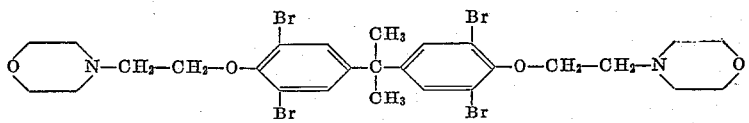

melting at 120–122° C.

For conversion into the dihydrochloride the base is dissolved in 50 cc. of absolute alcohol which contains the calculated quantity of hydrochloric acid gas. After a short time the dihydrochloride begins to precipitate. It is suction-filtered, washed with alcohol and dried. The product melts at 206–207° C.

Example 13

A solution of 19.3 grams of β:β-bis-(3-bromo-4-hydroxy-phenyl)-propane in 100 cc. of absolute alcohol is added in one portion to a solution of 4.6 grams of sodium in 200 cc. of absolute alcohol. 18.6 grams of morpholinoethyl chloride hydrochloride are then added, the reaction mixture stirred for 6 hours under reflux and left to stand at room temperature overnight. The precipitated sodium chloride is filtered off and the alcoholic mother liquor evaporated to dryness to yield dimethyl-bis-[3-bromo-4-(morpholino-ethoxy)-phenyl]-methane of the formula

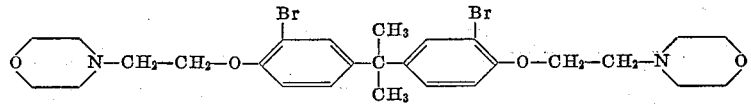

as a viscous oil.

By dissolving the oil in 100 cc. of ethyl acetate and adding the calculated quantity of alcoholic hydrochloric acid, the product may be converted into the dihydrochloride which melts at 234–237° C.

Example 14

A solution of 20.7 grams of 1:1-bis-(3:5-dichloro-4-hydroxy-phenyl)-cyclohexane in 100 cc. of absolute alcohol is added in one portion to a solution of 2.35 grams of sodium in 100 cc. of absolute alcohol. 13.9 grams of chlorethyldiethylamine dissolved in 50 cc. of absolute benzene are then added dropwise in the course of about 10 minutes, with stirring, to the reaction solution. Stirring is continued for 6 hours under reflux, the reaction mixture allowed to stand overnight, the precipitated sodium chloride filtered off and the alcoholic filtrate evaporated to dryness to yield penta-methylene-bis-[3:5-dichloro - 4-(diethylaminoethoxy)-phenyl]-methane of the formula

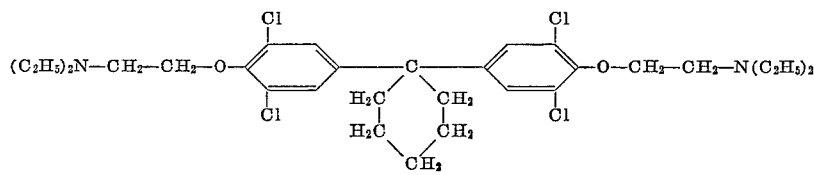

as an almost colorless, viscous oil.

By dissolving the product in 100 cc. of absolute alcohol and adding an alcoholic solution of the calculated quantity of citric acid, it is converted into the dicitrate melting at 125–126° C.

*Example 15*

By the process described in the preceding example and using 2.17 grams of sodium, 15.9 grams of 1:1-bis-(3-chloro-4-hydroxy-phenyl)-cyclohexane and 12.8 grams of chlorethyldiethylamine, there is obtained penta-methylene-bis - [3-chloro-4-(diethylamino-ethoxy)-phenyl]-methane of the formula

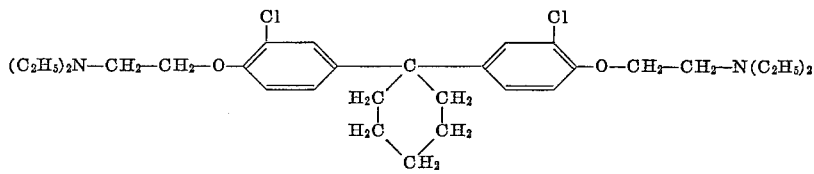

The dicitrate of this base melts at 121–123° C.

*Example 16*

1.7 g. of sodium are dissolved in 75 ml. of absolute alcohol and the solution treated with a solution of 20.0 g. of 1,1-bis-(3,5-dibromo-4-hydroxy-phenyl)-cyclohexane in 100 ml. of absolute alcohol. There are then added dropwise in the course of 5 minutes 9.8 g. of chloro-ethyl-diethylamine in 50 ml. of absolute benzene and the reaction mixture is stirred and refluxed for 6 hours. After cooling, the precipitated sodium chloride is filtered off, and the mother liquor evaporated to dryness. The oily residue is dissolved in 200 ml. of ethyl acetate, freed from a slight turbidity by filtration, and the solution then treated with 40 ml. of 2.4 N-alcoholic hydrochloric acid. The pentamethylene - bis[3:5-dibromo-4-($\beta$-diethylaminoethoxy)-phenyl]]-methane dihydrochloride of the formula

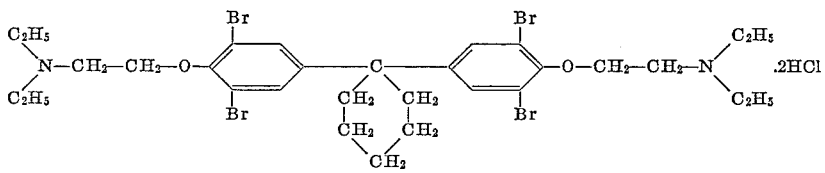

precipitates and is recrystallized from acetonitrile. Melting point, 208–210° C. (with decomposition).

What is claimed is:

1. A member selected from the group consisting of compounds of the formula

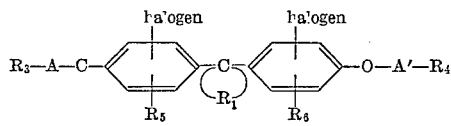

in which $R_1$ stands for lower alkylene, $R_3$ and $R_4$ each stands for a tertiary amino group in which the substituents are members selected from the group consitsing of lower alkyl, lower alkenyl, cyclo-lower alkyl, cyclo-lower alkenyl, phenyl-lower alkyl, N,N-lower alkylene, N,N-mono-doxa-lower alkylene, N,N-mono-aza-lower alkylene and N,N-mono-thia-lower alkylene, $R_5$ and $R_6$ each stands for a member selected from the group consitsing of hydrogen, chlorine and bromine, and A and A' each stands for lower alkylene having from 2 to 5 carbon atoms and separating tertiary amino from oxy by at least two carbon atoms, halogen stands for chlorine and bromine and acid addition salts thereof.

2. A member selected from the group consisting of a compound of the formula

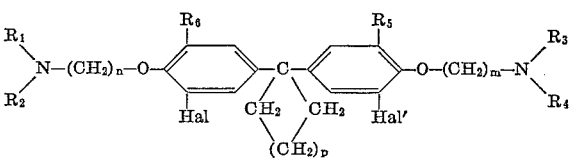

in which $n$, $p$ and $m$ each stands for an integer from 2 to 3, Hal and Hal' each stands for a member selected from the group consisting of chlorine and bromine, $R_5$ and $R_6$ each stands for a member selected from the group consisting of chlorine, bromine and hydrogen, $R_1$ and $R_2$ stand for a member selected from the group consisting of lower alkyl, and, when taken together, lower alkylene, mono-oxa-lower alkylene, mono-aza-lower alkylene and mono-thia-lower alkylene, and $R_3$ and $R_4$ stand for a member selected from the group consisting of lower alkyl, and when taken together, lower alkylene, mono-oxa-lower alkylene, mono-aza-lower alkylene and mono-thia-lower alkylene, and an acid addition salt thereof.

3. Pentamethylene - bis - [4-($\beta$-diethylamino-ethoxy)-3:5-dichlorophenyl]-methane.

4. Pentamethylene - bis - [4-($\beta$-diethylamino-ethoxy)-3-chlorophenyl]-methane.

5. Pentamethylene - bis - [4-($\beta$-diethylamino-ethoxy)-3:5-dibromophenyl]-methane.

No references cited.

CHARLES B. PARKER, *Primary Examiner.*

R. V. HINES, *Assistant Examiner.*